United States Patent [19]

Haun

[11] Patent Number: 5,308,802
[45] Date of Patent: May 3, 1994

[54] SOL-GEL PROCESS OF MAKING GLASS, PARTICULARY GRADIENT-INDEX GLASS

[75] Inventor: Niels Haun, Rochester, N.Y.

[73] Assignee: The University of Rochester, Rochester, N.Y.

[21] Appl. No.: 83,644

[22] Filed: Jun. 25, 1993

[51] Int. Cl.$^5$ .............................................. C03C 3/04
[52] U.S. Cl. ...................................... 501/12; 501/54; 501/55; 65/31
[58] Field of Search ....................... 501/12, 38, 54, 55, 501/68; 65/31, 3.15

[56] References Cited

U.S. PATENT DOCUMENTS

| | | | |
|---|---|---|---|
| 4,686,195 | 8/1987 | Yamane | 501/12 |
| 4,797,376 | 1/1989 | Caldwell et al. | 501/12 |
| 4,902,650 | 2/1990 | Caldwell et al. | 501/12 |
| 5,068,208 | 11/1991 | Haun et al. | 501/12 |

OTHER PUBLICATIONS

Mukherjee, S. P., "Gradient Index Lens Fabrication Processes: A Review, in Topical Meeting on Gradient-Index Optical Imaging Systems," Honolulu, Hawaii, Optical Society of America (1981), pp. Tu A1-1 to Tu A1-5.

M. Yamane et al., "Gradient-Index Glass Rods of PbO-$K_2$O-$B_2$O$_3$-SiO$_2$ System Prepared by the Sol-Gel Process," *Journal of Non-Crystalline Solids*, 100, 506-10 (1988).

Shingyouchi et al., *Electronics Letters*, 22:99-100, 1108-1110 (1986).

*Primary Examiner*—Karl Group
*Attorney, Agent, or Firm*—M. Lukacher; M. L. Goldman

[57] ABSTRACT

The present invention relates to a process for making glass by the sol-gel process. A mixture of silicon alkoxide, at least two other metal alkoxides, and alcohol in a solution sufficiently acidic to hydrolyze partially the silicon alkoxide is formed. Water is then added under agitation to convert the metal alkoxides to a network of corresponding metal oxides suitable for gelation. The mixture containing the network of metal oxides is then molded for a sufficient time to form a gel. Substantially only oxides of one of the at least two other metals is then removed from the gel, which is then fixed in a liquid capable of arresting such additional removal. The fixed gel is then dried and sintered to form a glass. The step of removing the at least one other metal oxide from the gel can be followed with a step of withdrawing partially oxides of one of the remaining at least two other metals in order to form a transparent gradient-index glass after sintering.

27 Claims, No Drawings

SOL-GEL PROCESS OF MAKING GLASS, PARTICULARY GRADIENT-INDEX GLASS

FIELD OF THE INVENTION

The present invention relates to a method of making glass from an alkoxide-containing mixture.

BACKGROUND OF THE INVENTION

Gradient-index glass is often made in the form of solid cylindrical bodies. The index of such bodies changes radially, usually with the highest index being along the axis of the cylinder and the lowest index located at the outer periphery.

Generally, the profile of a radial gradient-index glass can be mathematically expressed in terms of the following formula:

$$n = N_{00} + N_{10}r^2 + N_{20}r^4 \ldots,$$

where:
n is the refractive index,
r is the radial distance from the axis of the glass to its periphery, and
$N_{00}$, $N_{10}$, and $N_{20}$ are constants.

Parabolic gradient profile shapes are particularly desirable for gradient-index glass used in lenses, and, for such configurations, the above formula simplifies to the following:

$$n = N_{00} + N_{10}r^2.$$

In defining the profile shape of gradient index glass, the $N_{10}$, $\Delta n$, and % $\Delta n$ due to $N_{10}$ (i.e., $(N_{10}r^2_{periphery}/\Delta n) \times 100$) parameters are particularly important. $\Delta n$ is defined as the difference between the refractive index at the periphery and the axis of the glass. For a parabolic glass configuration, $\Delta n$ is $N_{10}(r^2_{periphery} - r^2_{axis})$, where $r_{axis}$ is zero. The optical power contributed by gradient index glass is dictated by the value of $N_{10}$, with $N_{10}$ values less than 0 indicating a positive optical power. The more negative $N_{10}$ is, the more positive optical power is introduced. The % $\Delta n$ due to the $N_{10}$ term is a primary indicator of the parabolic character of a particular gradient index glass. As the % $\Delta n$ due to the $N_{10}$ term approaches 100%, the particular glass assumes a more parabolic configuration.

The use of gradient index glass in optical elements provides many advantages over homogeneous glass bodies in which the index is constant. For example, a single gradient-index glass element provides the performance of multiple element lenses and reduces the volume of the body. The applications for gradient index glass have, however, been limited by the lack of suitable materials and of suitable production techniques. For example, the limitations of ion exchange processes relate to size, environmental and thermal stability, index profile dispersion, base index (i.e., $N_{00}$), and maximum $\Delta n$.

Historically, gradient index glass has been made with silicate preforms. See, e.g., U.S. Pat. Nos. 3,938,974 and 4,302,231. These preforms are fabricated either by leaching a phase separated glass or by sol gel methods.

Such techniques involve creating and then fixing into place a concentration gradient of refractive index modifying dopants within the porous preform. The preform is then dried and heated until it becomes a pore-free glass element with an index gradient. The sol gel and other techniques are reviewed in U.S. Pat. No. 4,686,195 to Yamane.

Gradient index glass prepared by diffusion in inorganic oxide gel monoliths is proposed by Mukherjee, S.P., "Gradient Index Lens Fabrication Processes: A Review, in Topical Meeting on Gradient-Index Optical Imaging Systems," Honolulu, Hi., Optical Society of America (1981), pages Tu Al 1 to Tu Al 5. This paper identifies the following potential advantages of using sol gel precursors in the production of gradient index glass: (1) relatively large diffusion coefficients; (2) low energy consumption during most the process; and (3) the ability to introduce a broad variety of index modifying dopants into the sol-gel preform.

U.S. Pat. No. 4,686,195 to Yamane produces gradient index glass by a sol-gel technique. This technique involves mixing a silicon alkoxide with water, a source of boron oxide, and an aqueous metal salt solution which is the source of modifier cations. This mixture forms a gel which then is placed in a solution to leach out some of the metal salts contained within it and to have other metal salts introduced into it by diffusion. The gel is then dried and sintered into glass. M. Yamane et. al, "Gradient-Index Glass Rods of $PbO \cdot K_2O \cdot B_2O_3 \cdot SiO_2$ System Prepared by the Sol Gel Process," Journal of Non Crystalline Solids, 100, 506-10 (1988) discloses a similar process in which the concentration gradient index of cations is fixed by a reprecipitation mechanism in acetone or iso propanol.

Shingyouchi et. al., Electronics Letters, 22:99 100, 1108-1110 (1986), utilizes germanium alkoxide as the index modifying cation. The index modifier is thus fully incorporated into the gel structure, and the index profile does not suffer from uncontrollable asymmetry.

First, tetramethoxy silane (a silicon alkoxide) is combined with tetraethoxy germanium (a germanium alkoxide), ethanol, water, and hydrochloric acid. The mixture forms a gel which is placed in water to leach out some of the germanium component. The gel is then washed in methanol to fix the germanium concentration gradient, dried, and sintered into gradient index glass. Shingyouchi el. al. also uses titanium to replace germanium as the index modifying cation. The resulting glass is a 2mm diameter rod with a $\Delta n$ of 0.013.

The method of Shingyouchi et. al. involves the use of only two components: silica and an index modifying oxide, such as germanium dioxide or titanium dioxide. The method can be generalized to substitute zirconium dioxide as well. These binary systems, however, yield gels with decreased porosity, making them difficult to dry and sinter without fracturing or bloating. The $SiO_2 \cdot TiO_2$ binary system tends to crystallize at elevated temperatures if the $TiO_2$ content tends to bloat at elevated temperatures, because the outside portions of the gel collapse before the inside portions, thereby trapping any released gases.

U.S. Pat. Nos. 4,797,376 and 4,902,650 to Caldwell et al. disclose a sol gel method for producing gradient index glass in a ternary system. This process is initiated by forming a mixture of silicon alkoxide and alcohol in an aqueous solution sufficiently acidic to hydrolyze partially the silicon alkoxide. An index modifying metal alkoxide, an additional metal alkoxide, and water are then added to the mixture. This converts the metal alkoxides to a network of corresponding metal oxides suitable for gelation. A gel is then formed by molding the mixture containing the network of metal oxides. The gel is acid leached, fixed in alcohol, dried, and sintered to a transparent gradient index glass. U.S. Pat. No. 5,068,208 to Haun, et al. discloses the use of water or a mixture of water and alcohol as fixing agents in such processes.

In the processes disclosed by U.S. Pat. Nos. 4,797,376 and 4,902,650 to Caldwell, et al. and U.S. Pat. No. 5,068,208 to Haun, et al., the alkoxide mixture typically includes alkoxides of silicon, aluminum, and titanium. When the resulting gel is leached with a strong acid, both the aluminum structure modifier and the titanium index modifier are removed simultaneously. The glass ultimately produced has been deficient, because the presence of the aluminum during the removal of the titanium alters the manner in which the titanium is removed. This can adversely affect the final an or profile shape. The process of the present invention is directed to overcoming such deficiencies.

SUMMARY OF THE INVENTION

The present invention relates to a process for making glass from a mixture of a silicon alkoxide, at least two other metal alkoxides, and an alcohol in a solution which is sufficiently acidic to hydrolyze partially the silicon alkoxide. Water is then added to the mixture, preferably under agitation, to convert the metal alkoxide to a network of corresponding metal oxides suitable for gelation. The mixture containing the network of metal oxides is then molded (i.e. contained) for sufficient time to form a gel. The gel is then treated to remove substantially only one of the at least two other metal oxides from the gel after which the gel is fixed in a liquid capable of arresting further removal of metal oxides. The fixed gel is then dried and sintered to form a glass.

In the case of a ternary alkoxide system (e.g., Si-Ti-Al), this procedure is advantageous in removing the oxide of one component (e.g., $Al_2O_3$) to produce a clear, homogeneous binary glass (e.g., $SiO_2 \cdot TiO_2$). Binary $SiO_2 \cdot TiO_2$ glass produced from gels which do not contain $Al_2O_3$ are prone to crack or warp during drying and sintering and, therefore, are difficult to process into monolithic glass bodies. Attempts to avoid these problems in such binary systems require limiting the gel size and very slow drying and sintering of these gels. By contrast, binary glasses formed by removal of $Al_2O_3$ from a ternary system are much less likely to encounter such problems. Since these gels are free from these defects, much larger forms are possible and the processing time from gel to glass can be decreased by two or more orders of magnitude. Moreover, the time required to dry and sinter such gels which are always binary is longer than that needed to remove $Al_2O_3$ from a ternary gel.

The present invention also relates to a process for making gradient index glass from a mixture of a silicon alkoxide, at least two other metal alkoxides, and an alcohol in a solution sufficiently acidic to hydrolyze partially the silicon alkoxide. Water is added to the mixture, preferably under agitation, to convert the metal alkoxides to a network of corresponding metal oxides suitable for gelation. The mixture containing the network of metal oxides is then molded (i.e. contained) for sufficient time to form a gel. Substantially only one of the at least two other metal oxides (e.g., $Al_2O_3$) is removed from the gel followed by partial withdrawal (i.e. leaching) of one of the remaining at least two other metal oxides. The gel is then fixed in a liquid capable of arresting such removal and withdrawal of metal oxides and dried. The dried gel is then sintered to form a transparent gradient-index glass.

This process has a number of advantages over previous techniques. The principal objective of the process is the introduction of a composition gradient in at least one metal oxide (i.e. the partially withdrawn oxide). Sequential removal eliminates the tendency of other metal oxides to inhibit or alter the withdrawal of the gradient metal oxide. This can result in a greater Δn, more desirable profile shapes, and better control of the process. In the aforementioned ternary embodiment, sequential removal allows $Al_2O_3$ in the gel for structural benefits, while preventing $Al_2O_3$ from participating in the withdrawal of the gradient metal oxide, $TiO_2$.

DETAILED DESCRIPTION OF THE INVENTION

The present invention relates to a process for making glass from a mixture of a silicon alkoxide, at least two other metal alkoxides, and an alcohol in a solution which is sufficiently acidic to hydrolyze partially the silicon alkoxide. Water is then added to the mixture, preferably under agitation, to convert the metal alkoxide to a network of corresponding metal oxides suitable for gelation. The mixture containing the network of metal oxides is then molded (i.e. contained) for sufficient time to form a gel. The gel is then treated to remove substantially only one of the at least two other metal oxides from the gel after which the gel is fixed in a liquid capable of arresting further removal of metal oxides. The fixed gel is then dried and sintered to form a glass.

The present invention also relates to a process for making gradient index glass from a mixture of a silicon alkoxide, at least two other metal alkoxides, and an alcohol in a solution sufficiently acidic to hydrolyze partially the silicon alkoxide. Water is added to the mixture, preferably under agitation, to convert the metal alkoxides to a network of corresponding metal oxides suitable for gelation. The mixture containing the network of metal oxides is then molded (i.e. contained) for sufficient time to form a gel. Substantially, only one of the at least two other metal oxides is removed from the gel followed by partial withdrawal of one of the remaining at least two other metal oxides. The gel is then fixed in a liquid capable of arresting such removal and withdrawal of metal oxides and dried. The dried gel is then sintered to form a transparent gradient index glass.

In accordance with the present invention, an alkoxide of silicon, diluted with alcohol, is hydrolyzed partially by adding a small amount of slightly acidic water. This use of silicon alkoxide provides $SiO_2$ to the gel which is the chosen glass former for this system.

After partial hydrolysis, at least one additional, different metal alkoxide is added. The additional alkoxide acts as a source of an index modifying metal or dopant. Alkoxides of titanium, zirconium, and mixtures thereof are suitable for this purpose. A third alkoxide, which functions as a source of a gel structure modifying metal should also be added. An example of a suitable alkoxide of a gel structure modifying metal is aluminum. Other additional alkoxides can be added to produce a system that is of higher order than ternary. These include alkoxides of boron or germanium.

The addition of an aluminum alkoxide furnishes $Al_2O_3$ to the gel. Gels containing $Al_2O_3$ tend to have a lower density and a coarser microstructure when dried.

The coarse structure makes the dry gel more resistant to fracture during heating and allows gaseous reaction products formed during the sintering to flow freely out of the gel, thus preventing bloating. The presence of $Al_2O_3$ tends to increase the temperature at which the gel collapses into glass. As a result, reactions which cause bloating are more likely to be completed before the gel collapses. When present in a gel containing $TiO_2$ or $ZrO_2$, $Al_2O_3$ helps to reduce the rate of crystallization and increases the temperature at which crystallization occurs.

The addition of a boron alkoxide provides the gel with $B_2O_3$. presence of $B_2O_3$ eliminates bloating which occurs during the leaching stage by lowering the sintering temperature of the center of the gel relative to outer portions of the gel. As a result, the center will sinter first and release gases to prevent them from being trapped within the collapsing gel. Also, $B_2O_3$ substantially reduces the tendency of a gel containing $TiO_2$ or $ZrO_2$ to crystallize at high temperature.

The use of germanium alkoxides furnishes $GeO_2$ which performs a function similar to $B_2O_3$, but also significantly contributes to the total index change.

Tetramethoxy silane ("TMOS") is the preferred silicon alkoxide. The preferred source of $B_2O_3$ is triethyl borate or tributyl borate. The preferred sources of $GeO_2$, $ZrO_2$, and $TiO_2$ are the ethoxides, propoxides, or butoxides of germanium, zirconium, and titanium, respectively. The preferred source of $Al_2O_3$ is aluminum di(sec-butoxide) acetoacetic ester chelate. The metal oxides ($SiO_2$, $TiO_2$, $ZrO_2$, $Al_2O_3$, and $GeO_2$) are formed from their corresponding metal alkoxides by hydrolysis and polycondensation reactions. These reactions lead to the formation of a highly porous oxide gel.

The amount of $SiO_2$ in the gel should be between 60 and 98 mole %. Amounts below 60 mole % result in a gel which is too weak to withstand all of the processing steps. Amounts greater than 98 mole % will not achieve useful refractive index changes.

For gels incorporating $TiO_2$ as the main index modifier, the amount of $TiO_2$ in the gel should be at least 0.1 mole % but less than 25 mole %. For gels incorporating $ZrO_2$ as the main index modifier, the amount of $ZrO_2$ should also be at least 0.1 mole % but less than 25 mole %. Gels containing more than 25 mole % $TiO_2$ or $ZrO_2$ tend to dissolve during the leaching stage or crystallize during the sintering stage.

When $Al_2O_3$ is used as the gel structure modifier, the amount of $Al_2O_3$ should be between 1 and 25 mole %. The amount of $B_2O_3$ present should be less than 10 mole percent, and the amount of $GeO_2$ should be less than 10 mole %.

A mixture of silicon alkoxides, titanium alkoxides, and aluminum alkoxides is one preferred embodiment of the present invention. It is desirable to mix these alkoxides in amounts which will ultimately form a gradient index glass containing 89 to 98 mole % $SiO_2$, 0 to 5 mole % $\frac{1}{2}(Al_2O_3)$, and 0.1 to 6 mole % $TiO_2$. A composition of 85 mole % $SiO_2$, 10 mole % $\frac{1}{2}(Al_2O_3)$, and 5 mole % $TiO_2$ is particularly useful.

After a mixture of a silicon alkoxide, an index modifying metal alkoxide, and at least one additional metal alkoxide element is prepared, it is stirred and diluted with water to convert the metal alkoxides to a network of the corresponding metal oxides suitable for gelation. The mixture containing the network of metal oxides is then placed in a mold and allowed to set for sufficient time to form a gel. Once gelled, the mixture is aged at 20 to 100° C., preferably 50° C., for a time period of one hour to several weeks.

After aging, the gel is washed with water to remove alcohols or any additives used in the gel forming process. Such washing can be repeated several times, if needed, to achieve this objective. As a result of such washing, more desirable profile shapes are achieved in the resulting glass.

The washed gel is next placed in a bath containing a solvent which will remove substantially only the oxide of the gel structure modifying metal, while leaving $SiO_2$ and other metal oxides in the gel. In manufacturing gradient index glass from an alkoxide mixture, containing alkoxides of an index modifying metal like titanium and/or zirconium, oxides of such index-modifying metals are not removed from the gel by that solvent. Suitable solvents are monocarboxylic acids, including acetic acid, formic acid, propionic acid, butyric acid, and mixtures thereof. Acetic acid is the preferred solvent. Such solvent contact is carried out at 0 to 90° C, preferably 21° C, for a time period sufficient to remove substantially all the oxide of the gel structure modifying metal.

Desirably, such contact with a solvent is followed by a water washing step to remove residual solvent from the gel. Such washing can be repeated several times in order to effect this result.

Next, the gel is placed in an acid leaching bath for a period of 15 minutes to 6 hours, preferably 16 minutes to leach out some of the index modifying metal oxide from the gel. Generally, acid leaching is carried out at 0 to 90° C., preferably 21° C. The acid leaching bath contains water and an acid selected from the group consisting of an inorganic acid, a dicarboxylic acid, or mixtures thereof. Suitable inorganic acids include hydrochloric acid, sulfuric acid, nitric acid, or mixtures thereof. Useful dicarboxylic acids include oxalic acids, malonic acid, and mixtures thereof. In manufacturing gradient-index glass from an alkoxide mixture, the acid leaching bath removes index modifying metals like titanium and/or zirconium from the gel.

Next, the gel is placed in a fixing bath to arrest leaching. The fixing bath can contain water, an alcohol containing 1–4 carbon atoms, acetone, and mixtures thereof. Particularly suitable alcohols are methanol and ethanol. Wide ranges of the fixing agents can be utilized.

The fixed gel is dried to produce a porous oxide body with a greater percentage of index modifying dopants at its center than at its edge. Drying can be carried out at 21° to 100° C., preferably 50° C., for at least two days, preferably three days, depending on the size of the gel.

The dried gel is sintered into a transparent gradient index glass by heating the gel to a temperature between 800° to 1600° C. for a period of 8 to 24 hours, preferably 20.5 hours. One suitable sintering schedule comprises heating by 30° C. per hour to 600° C. in air, heating by 50° C. per minute to 1100° C. in oxygen, heating by 20° C. per minute to 1500° C. in helium, holding for three minutes, and cooling to room temperature.

EXAMPLES

The following examples are illustrative of the present invention.

EXAMPLE 1

15.63 ml of dimethyl formamide, 15.63 ml of methanol, 9.68 ml of tetramethyl orthosilicate, and 1.18 ml of an 0.1 M aqueous solution of hydrochloric acid were stirred together for 15 minutes. 1.15 ml of titanium isopropoxide and 2.33 grams of aluminum di(sec-butoxide) acetoacetic ester chelate then were added and the mixture was stirred for 1 hour. 4.39 ml of water then was added and the mixture was stirred for 5 minutes. 4 ml of the resulting solution was poured into each of eleven 11 mm diameter×50 mm polypropylene test tubes which were immediately capped. The solution inside the test tubes formed a stiff gel within 4.5 hours at room temperature. The gels were kept closed inside the test tubes while they were aged for 2½ days at 50° C.

The gels were placed in glass test tubes containing 150ml of acetic acid for three days, with that solution being changed every 24 hours. The test tubes were rotated end over end to provide agitation.

The acid was removed, and the gels were fixed in 150 ml of fixing solution (i.e., 100 volume % methanol in this example) while the test tubes were rotated. The solution was replaced with fresh solution after 8 hours. 16 hours later, the methanol was removed from the test tubes and the gels were dried in the test tubes in an oven at 50° C. for 1½ days.

Next, the gels were heated at 30° C. per hour to 600° C. in air, held for 4 hours, held for 4 hours in oxygen, heated at 50° C. per minute to 1100° C. in an oxygen atmosphere, and, for final sintering, heated at 20° C. per minute to 1485° C. in a helium atmosphere and held for 2 minutes. The resulting glass rods were removed from the furnace and cooled to room temperature.

The resulting rods were 3.7 mm in diameter, about 13 mm long, and were composed of a transparent, homogeneous titania-silica glass which was free from defects. Across the diameter of the rods, the level of $Al_2O_3$ and $TiO_2$ was substantially uniform. More particularly, the content of $Al_2O_3$ was less than 1.0 mole %, while the content of $TiO_2$ was less than 6 mole %.

EXAMPLE 2

Gels were made according to paragraph 1 of Example 1 and then processed as follows.

The gels were placed in glass test tubes containing 50 ml of 50% aqueous acetic acid for three days with the solution being changed every 24 hours. The gels were then rinsed in 50 ml of water for two days with the rinsing water being replaced with fresh water every 12 hours. The gels were placed in a 50 ml solution of 3M $H_2SO_4$ for 15 minutes. During this period, the test tubes were rotated end over end.

After leaching with $H_2SO_4$ solution, the gels were fixed in 50 ml of water, with the fixing water being changed every 15 minutes for a total of nine water fixes. The gel was left in the last water fix for 23 hours for a total 25 hours in water. The gels were then washed with 50 ml of methanol for 23 hours, removed from the test tubes, and dried in an oven at 50° C. for one and a half days.

The dried gels were then sintered in a manner similar to that described in Example 1, except that the final sintering temperature was 1425° C. which was held for 3 minutes. As a result, gradient-index glass rods having a diameter of 3.7 mm and a length of about 13 mm were produced. The rods had a total index change of −0.0138.

EXAMPLE 3

The process of Example 2 was repeated, except that the gels were leached in aqueous $H_2SO_4$ solution for 30 minutes, and the final sintering involved heating to a temperature of 1450° C., holding for one minute, reducing the temperature to 1440° C., and holding for 2 minutes. The 3.7 mm diameter×13 mm long glass rods produced as a result of sintering had a total index change of −0.0147.

EXAMPLE 4

The process of Example 2 was repeated except that the gels were leached in aqueous $H_2SO_4$ solution for 60 minutes and the final sintering involved heating to a temperature of 1460° C., holding for 2 minutes, heating to 1470° C., and holding for one minute.

EXAMPLE 5

The process of Example 2 was repeated except that the gels were leached in aqueous $H_2SO_4$ solution for two hours and the final sintering involved heating to a temperature of 1470° C., holding for 2 minutes, heating to 1475° C., and holding for one minute.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. A process for making glass comprising:
   forming a mixture of a silicon alkoxide, at least two other metal alkoxides, and an alcohol in a solution sufficiently acidic to hydrolyze partially the silicon alkoxide;
   adding water to the mixture to convert the metal alkoxides to a network of corresponding metal oxides suitable for gelation;
   containing the mixture containing the network of metal oxides for sufficient time to form a gel;
   removing substantially only one of the at least two other metal oxides from the gel;
   fixing the gel in a liquid capable of arresting said removing;
   drying the fixed gel; and
   sintering the dried gel to form a glass.

2. A process according to claim 1, wherein the at least two other metals are a gel structure modifying metal and an additional metal.

3. A process according to claim 2, wherein the additional metal is selected from the group consisting of titanium, zirconium, and mixtures thereof.

4. A process according to claim 2, wherein the gel structure modifying metal is aluminum.

5. A process according to claim 2, wherein an oxide of substantially all the gel structure modifying metal is taken out of the gel during said removing and said process further comprises:
   withdrawing an oxide of the additional metal from the gel after said removing the oxide of the gel structure modifying metal.

6. A process according to claim 5, wherein the additional metal is titanium and the gel structure modifying metal is aluminum.

7. A process according to claim 1, wherein said removing is carried out by contacting the gel with a monocarboxylic acid solvent.

8. A process according to claim 7, wherein the monocarboxylic acid solvent is selected from the group consisting of acetic acid, formic acid, propionic acid, butyric acid, and mixtures thereof.

9. A process according to claim 7, wherein the monocarboxylic acid solvent is acetic acid.

10. A process according to claim 1, wherein the liquid for carrying out said fixing is selected from the group consisting of water, alcohol, acetone, and mixtures thereof.

11. A process according to claim 1 further comprising:
washing the molded gel with water before said removing.

12. A process for making gradient index glass comprising:
forming a mixture of a silicon alkoxide, at least two other metal alkoxides, and an alcohol in a solution sufficiently acidic to hydrolyze partially the silicon alkoxide;
adding water to the mixture to convert the metal alkoxides to a network of corresponding metal oxides suitable for gelation;
containing the mixture containing the network of metal oxides for sufficient time to form a gel;
removing substantially only one of the at least two other metal oxides from the gel;
withdrawing partially one of the at least two other metal oxides from the gel remaining after said removing;
fixing the gel in a liquid capable of arresting said removing and withdrawing;
drying the fixed gel; and
sintering the dried gel to form a transparent gradient-index glass.

13. A process according to claim 12, wherein the at least two other metals comprise a gel structure modifying metal and an index modifying metal.

14. A process according to claim 13, wherein the index modifying metal is selected from the group consisting of titanium, zirconium, and mixtures thereof.

15. A process according to claim 14, wherein the alkoxide of the index modifying metal is present in the mixture in an amount sufficient to produce a gradient-index glass containing 0.1 to 25 mole % of corresponding index modifying oxide.

16. A process according to claim 13, wherein the gel structure modifying metal is aluminum.

17. A process according to claim 16, wherein the alkoxide of the gel structure modifying metal is present in the mixture in an amount sufficient to produce a gradient index glass containing less than 25 mole % of corresponding additional metal oxide.

18. A process according to claim 13, wherein an oxide of the gel structure modifying metal is taken out of the gel during said removing and an oxide of the index modifying metal is taken out of the gel during said withdrawing.

19. A process according to claim 18, wherein the index modifying metal is titanium and the gel structure modifying metal is aluminum.

20. A process according to claim 12, wherein said removing is carried out by contacting the gel with a monocarboxylic acid solvent.

21. A process according to claim 20, wherein the monocarboxylic acid solvent is selected from the group consisting of acetic acid, formic acid, propionic acid, butyric acid, and mixtures thereof.

22. A process according to claim 21, wherein the monocarboxylic acid solvent is acetic acid.

23. A process according to claim 12, wherein said withdrawing is carried out in a bath comprising water and an acid selected from the group consisting of an inorganic acid, a dicarboxylic acid, and mixtures thereof.

24. A process according to claim 23, wherein the acid is an inorganic acid selected from the group consisting of hydrochloric acid, sulfuric acid, nitric acid, and mixtures thereof.

25. A process according to claim 23, wherein the acid is a dicarboxylic acid selected from group consisting of oxalic acid, malonic acid, and mixtures thereof.

26. A process according to claim 12, wherein the liquid for carrying out said fixing is selected from the group consisting of water, alcohol, acetone, and mixtures thereof.

27. A process according to claim 12, wherein the silicon alkoxide is incorporated in the mixture in an amount sufficient to produce a gradient-index glass containing 60 to 98 mole % silicon dioxide.

* * * * *